United States Patent [19]

Eck

[11] 4,337,581
[45] Jul. 6, 1982

[54] TARGET STRUCTURE FOR USE WITH AN ALIGNMENT APPARATUS

[75] Inventor: Leonard F. Eck, McPherson, Kans.

[73] Assignee: Kansas Jack, Inc., McPherson, Kans.

[21] Appl. No.: 122,530

[22] Filed: Feb. 19, 1980

[51] Int. Cl.³ ............................................ G01B 11/275
[52] U.S. Cl. .................................. 33/288; 33/203.18; 33/336; 356/155
[58] Field of Search ..................... 33/288, 203.18, 336, 33/335, 203; 356/155, 154

[56] References Cited

U.S. PATENT DOCUMENTS

| | | |
|---|---|---|
| 2,249,226 | 7/1941 | Peters . |
| 2,972,189 | 2/1961 | Holub . |
| 3,135,052 | 6/1964 | MacMillan . |
| 3,159,916 | 12/1964 | Hunter . |
| 3,206,862 | 9/1965 | Hunter . |
| 3,409,990 | 11/1968 | Vorpahl . |
| 3,439,987 | 4/1969 | Bacher et al. . |
| 3,501,240 | 3/1970 | Haynes . |
| 3,689,161 | 9/1972 | Lill et al. ............................ 356/155 |
| 3,876,310 | 4/1975 | Berndt . |
| 3,951,551 | 4/1976 | Macpherson . |
| 4,095,902 | 6/1978 | Florer et al. ....................... 356/155 |
| 4,150,897 | 4/1979 | Roberts, Jr. et al. ............... 356/155 |

Primary Examiner—William D. Martin, Jr.
Attorney, Agent, or Firm—Fishburn, Gold and Litman

[57] ABSTRACT

A target structure for use with an alignment apparatus, such as a line of sight alignment apparatus for detecting the alignment of wheels of vehicles such as automobiles, truck tractors and trailers comprises an adjustable, wheel engaging and target supporting structure mountable upon a vehicle wheel rim. The target structure has an inner wheel mounting member with upper and lower arm members extending therefrom and engageable with the vehicle wheel rim. An outer target mounting member is pivotally connected to the inner wheel mounting member through coaxial center portions thereof for relative rotation of the outer target mounting member relative to the inner wheel mounting member. The outer target mounting member has spaced shaft members extended outwardly of the wheel and holding a plurality of targets at cardinal points around the wheel, the targets providing scales for determining the angular position of the vehicle wheels for conventional measurements such as caster, camber, toe and kingpin inclination. A sighting instrument establishes a line of sight parallel to and longitudinally spaced from the vehicle and which is directed toward a target and impinges upon a discrete mark on the scale thereof. Comparison of the points of impingement upon targets located at opposite cardinal points of the wheel establishes angular relations therebetween which correspond to alignment measurements.

13 Claims, 28 Drawing Figures

TARGET STRUCTURE FOR USE WITH AN ALIGNMENT APPARATUS

This invention relates to target structures for use in conjunction with alignment apparatuses for determining the angular relationships of vehicle wheels and, in particular, relates to a target structure mounted on a vehicle wheel and for use with a line of sight alignment instruments.

Vehicles, such as automobiles, trucks, truck tractors and trailers typically require periodic maintenance checks and adjustment of alignment. Normally, proper alignment is set when the vehicle is manufactured, however, after extensive usage, damage to the wheels or axle assemblies, such as occurs as by striking curbs, potholes and the like, misalignment may result and handling difficulties may be experienced. Misaligned wheels may impart a poor ride to the vehicle and have excessive tire wear characteristics stemming from the incorrect alignment. The vehicle may wander and pull to one side, which requires constant and annoying steering wheel correction by the driver, may have hard steering, front tire shimmy and, referring to rear dual wheels of truck tractors, trailers and the like, a tendency toward oversteering or understeering and improper tracking.

For vehicle front wheels, front end alignment centers on the precise geometric relationship of a number of inter-related parts, even when they are changing relative positions, which provide front wheel stability and control. These geometric angles include toe-in/toe-out, camber, caster and kingpin inclination (sometimes termed steering axis cant).

Camber is the angle which the centerline of the wheel makes with a vertical axis. The top of the wheel tilts away from the car under an unloaded condition so that the wheel becomes vertically oriented when the weight of the vehicle is on the wheel. Closely related to camber is toe, which is a horizontal measurement of the amount which both wheels are closer together at the front than at the rear of the wheel (toe-in), or vice versa (toe-out). Both camber and toe are related to vehicle weight on the wheels and to compressive forces occurring on the steering linkage with forward speed. Normally, the greater the camber, the greater is the toe-in.

Caster is the cant of the upper ball joint toward the rear of the vehicle. Caster moves the pivot point of the wheel forwardly of the tire's center and provides yet another type of directional stability by causing a drag on the bottom of the wheel when it turns, thereby resisting the turn and tending to hold the steering wheel steady in the direction of straight ahead vehicle movement. Too slight a caster angle will cause the wheels to wander or weave at high speed and steer erratically when the brakes are applied. In contrast, too great a caster angle encourages hard steering and low speed shimmy. Generally, placing the weight of the car directly over the pivot point allows for the easiest possible steering and tends to remove load from the outside wheel race bearings.

Steering axis cant, or kingpin inclination in vehicles employing a kingpin, is the angle from the vertical at which the steering knuckle is attached to the upper and lower ball joints. The canted steering knuckle controls wheel directional stability by forcing the wheel to lift the chassis in order to turn from a straight ahead direction or position. As the steering arm releases force on the wheel, the wheel automatically tends to return to its straight ahead position under the downward force of the weight of the chassis.

Additionally, the vehicle must track properly to provide for ease of steering and prevent excessive tire wear. Straight tracking is the condition whereby the rear wheels of the vehicle follow the front wheels in parallel relation.

These alignment determinations apply to steerable front wheels and with respect to nonsteerable rear wheels, such as the rear dual wheels of truck tractors, trailers and the like, tracking, toe and camber are the alignment factors which typically may be out of specification and must be determined. The rear axle may not be evenly centered relative to the vehicle body and may be offset, thereby causing a shorter radius of turn in one direction than another and leading to tracking and handling difficulties.

The principal objects of the present invention are: to provide a target structure for use with an alignment apparatus for determining angular alignment relationships of the wheels; to provide such a target structure having scaled targets which are easy to read and located for the convenience of the operator; to provide such a target structure which is easily mounted to a wheel; to provide such a target structure which, in conjunction with an alignment apparatus, is capable of a high degree of accuracy; to provide such a target structure having scaled targets for checking tracking, caster, camber, toe and kingpin inclination; to provide such a target structure with mounting portions which are adjustable for accomodating different wheel and tire sizes for accurate checking of substantially all automotive and truck vehicles; to provide such a target structure having targets which are adjustable and rotatable in orientation so as to provide great accuracy in checking horizontal and vertical wheel measurements; and to provide a target structure which is relatively inexpensive, sturdy and efficient in use and is well adapted for its intended purpose.

Other objects and advantages of this invention will become apparent from the following description taken in connection with the accompanying drawings wherein is set forth by way of illustration and example, a certain embodiment of this invention.

As required, a detailed embodiment of the present invention is disclosed herein, however, it is to be understood that the disclosed embodiment is merely exemplary of the invention which may be embodied in various forms, therefore, specific structural and functional details as disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally indicates a target structure embodying the present invention. The target structure 1 comprises target support means for mounting a target adjacent a wheel and includes an inner wheel mounting member 2 removably affixed to a wheel 3 and an outer target mounting member 4 with a pivot means mounting the outer wheel mounting member 4 to the inner wheel mounting member 2 for relative rotation. The outer target mounting member 4 supports a plurality of targets 5 having discreet indicia or scale marks thereon toward which lines of sight, as from a line of sight alignment apparatus are directed.

Figures 1, 2, 3:
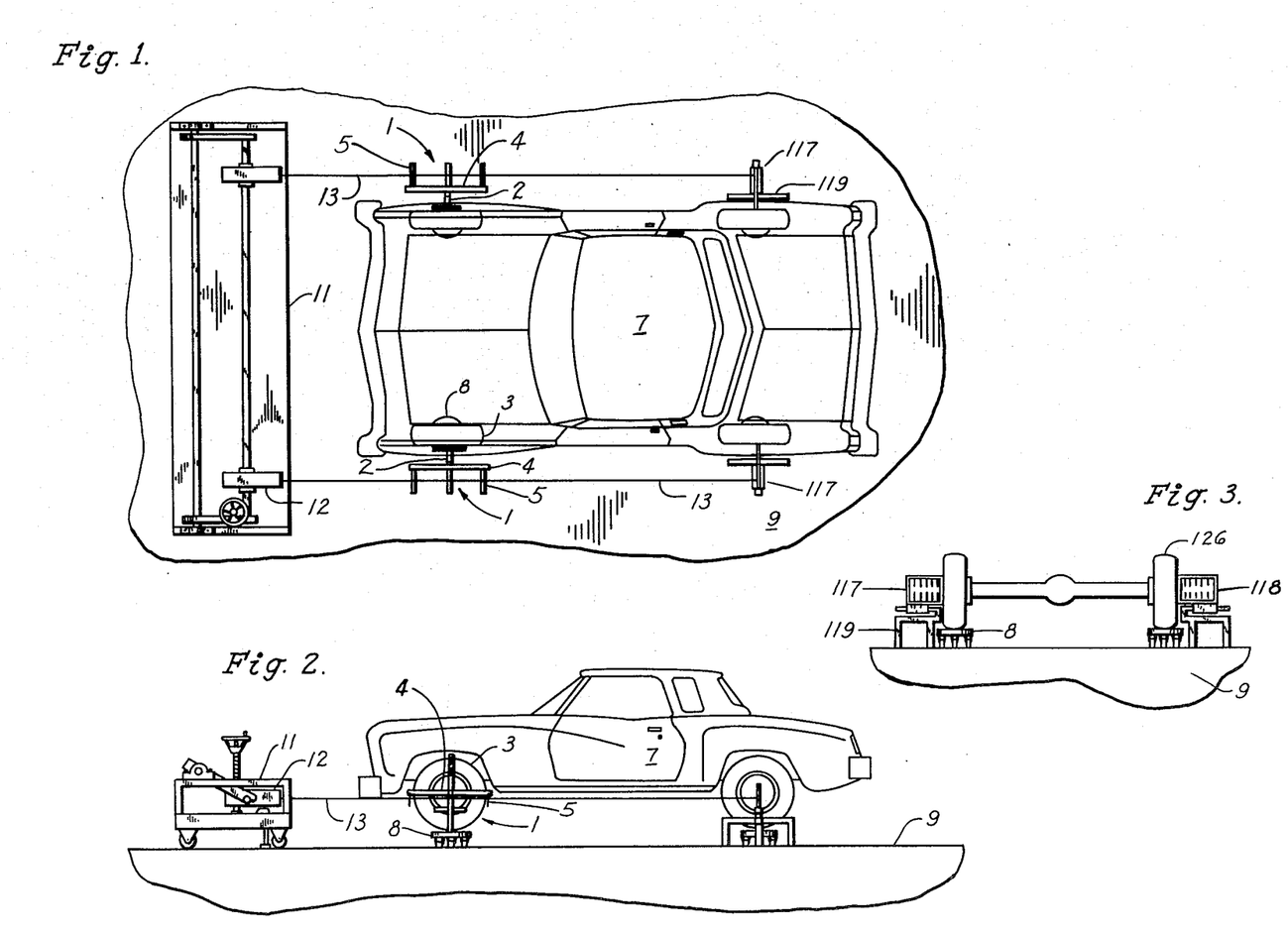
FIG. 1 is a plan view of target structures embodying the present invention and shown in connection with an automotive vehicle and a line of sight wheel alignment apparatus.
FIG. 2 is a side elevational view of the target structure mounted to a vehicle wheel and in the sight path of a line of sight wheel alignment apparatus.
FIG. 3 is a diagrammatic, elevational view of rear wheel target structures positioned adjacent rear wheels of the vehicle.

In the illustrated example, FIGS. 1 and 2, a vehicle 7, such as a truck, trailer or car of which the wheel alignment is to be checked, is positioned so that access is obtained to the underside thereof, as by raising on roller plates 8 movable on the flat surface of the garage floor 9, however, a ramp or other vehicle elevating and supporting structure may be used in those situations where a permanent or semipermanent installation is desired. An alignment apparatus 11, such as a line of sight vehicle alignment apparatus, has line of sight beam projectors 12 that project lines of sight 13. The lines of sight are directed toward targets 5 located on the wheels 3 of the vehicle 7.

The target structure 1 is mounted to the tire bead flange 16 of the wheel rim 17. The inner wheel mounting member 2 of the target structure 1 has an upstanding shaft member 19 which, in the illustrated example, extends substantially the diameter of the wheel 3. The exemplary shaft member 19 is comprised of square tubing and has means, such as upper and lower arm members 20 and 21 slidably affixed to the shaft member 19 for attachment to the wheel rim 17. The upper and lower arm members 20 and 21 have respective sleeve ends 22 and 23 with thumb screws extending therein and selectively slidable upwardly and downwardly on the shaft member 19 toward and away from a center 24 of the shaft member 19 to coaxially align the center 24 with the wheel hub center or vehicle axle. The upper and lower arm members 20 and 21 have respective diverging inclined portions 25 and 26 extending from the shaft member 19 toward the wheel rim 17.

An upper arm portion 27 is swingably affixed by a pivot pin 28 to a yoke extending upwardly from the inclined portion 25 and has an upper rim engaging hook shaped catch 30 secured to the end of the upper arm portion 27 as by a fastener 29 for swiveling of the catch 30 on the arm end and engaging the annular surface of the tire bead flange 16 by slipping between the flange and the tire. The catch 30 is maintained in engagement with the flange 16 by adjustment of a screw arrangement 31 having a knob 32 adapted for grasping and rotating the screw arrangement 31 to raise or lower the arm 27 and the catch 30 as desired and thereby affect the engagement of the catch 30 with the tire bead flange 16 as desired.

Extending outwardly from the lower inclined portion 26 and inwardly toward the wheel rim 17 are a pair of diverging, spaced lower rim engaging arm portions 35 and 36 which respectively have hook shaped catches 37 affixed to ends thereof by fasteners permitting swiveling of the catches 38 and for engaging the annular surface of the tire bead flange 16 between the flange and the tire.

Pivot means rotatably connect the inner wheel mounting member 2 to the outer target mounting member 4 and the targets 5 extend outwardly and horizontally from portions of the target mounting member 4. The outer target mounting member 4 includes an upstanding shaft member 40 and an outer cross shaft member 41 which are secured together in orthogonal relationship to form an outer cross structure having a center 42. The upstanding shaft member 40 and the outer cross shaft member 41 are preferably of generally the same length and the outer cross shaft member 41 has opposite sleeve portions 44 and 45 telescopically received on opposite ends thereof. Clamping fasteners 46 respectively extend through the telescopic sleeve portions 44 and 45 and bear against the outer surface of the cross shaft member 41 to lock the sleeve portions 44 and 45 into selected positions on the cross shaft member 41.

In the illustrated example, the pivot means includes a threaded shaft 48 secured to and extending laterally from the center 24 of the inner wheel mounting member 2 and through the center 42 of the outer target mounting member 4. A spacer 49 is sleeved on the threaded shaft 48 between the inner wheel mounting member 2 and the outer target mounting member 4 and facilitates ease of rotation between the members 2 and 4. A threaded knob 50 is mounted on an end of the threaded shaft 48 and locks the outer target supporting member 4 at a selected amount of rotation relative to the inner wheel mounting member 2.

The pivot means permits rotation of the outer target supporting member 4 relative to the inner wheel mounting member 2 whereby the outer target supporting member 4 can be maintained with the shaft member 40 in vertical orientation and the outer cross shaft member 41 in horizontal orientation to provide accurate measurements regardless of the amount of left or right turn of the wheels 3. A leveling indicator is mounted on the outer target supporting member 4 and, in the illustrated example, the leveling means includes a leveling vial 52 having a longitudinal axis affixed orthogonally to the upstanding shaft member 40 and located between the center 42 and a lower end thereof. The leveling vial 52 contains an amount of a fluid and a bubble and, when the bubble is centered, indicates that the shaft member 40 is vertical in orientation and the outer cross shaft member 41 is horizontal in orientation.

A plurality of targets 5 are supported by the upstanding shaft member 40 and the outer cross member 41 and are positioned to extend outwardly of the wheel 3. The target structure 1 is positioned so that the targets 4 project into the lines of sight 13 to measure an angular relation of each wheel 3 to the vehicle 7. The upstanding shaft member 40 has upper and lower end portions 54 and 55 and the sleeve portions 44 and 45 respectively have front and rear end portions 56 and 57. Each of the end portions 54, 55, 56 and 57 have arms 59 extending outwardly thereof and away from the wheel 3. The targets 5 preferably are affixed to sleeve members 60 which slide over the arms 59 and have a fastener 61 extended through the sleeve member 60 to selectively bear against the arm 59 and lock the target 5 into a desired position on the arm 59.

When the target structure 1 is mounted to the wheel rim 17, certain targets 5 are spaced circumferentially and outwardly of the wheel axle and are located at opposite vertically and horizontally aligned cardinal positions around the wheel rim 17; these respective target positions are hereinafter designated as upper and lower targets 63 and 64 and front and rear targets 65 and 66. An arm 67 extends outwardly from the upstanding shaft member 40 from a position intermediate of the upper end portion 54 and the center 42 and has a target 5 thereon designated as the lower upper target 68. The targets 5 are preferably planar in configuration and comprised of a sturdy, shatter resistant material such as plastic, aluminum or the like and generally have a plurality of scale marks or indicia suitably placed thereon as described below.

Figures 12, 13:
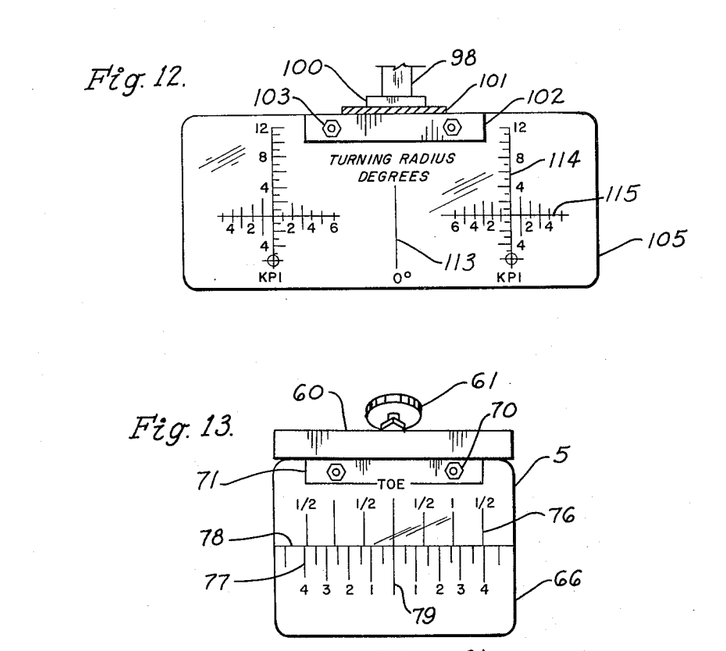
FIG. 12 is an enlarged, front elevational view of the kingpin inclination measuring device and showing the rear target thereof.
FIG. 13 is an enlarged elevational view of a front toe target.
Figure 14:
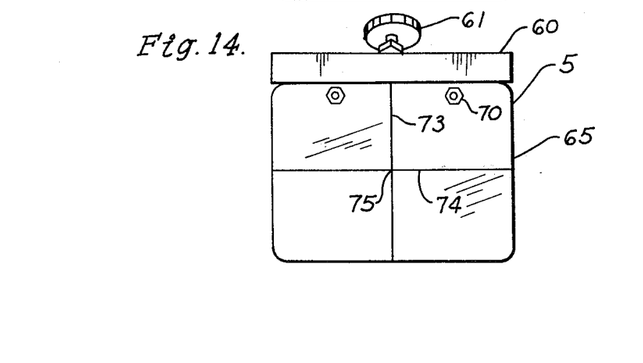
FIG. 14 is an enlarged elevational view of a rear toe target.

The targets 5 are individually illustrated in FIGS. 10 through 17. FIGS. 13 and 14 show targets which are used to measure horizontal angular relationships such as toe and used for either toe-in or toe-out, and are mounted upon the front and rear end portions 56 and 57 and comprise the front and rear targets 65 and 66. Either of the targets shown in FIGS. 13 and 14 may be positioned forwardly of the other provided that the front target is composed of a transparent material, such as Plexiglas, which permits a line of sight 13 to pass therethrough and visually impinge upon a scale mark of the rear target. The rear target may be of an opaque material, such as aluminum. Each of the targets 63, 64, 65 and 66 is connected to the sleeve member 60 therefor by fasteners 70 which extend through a flange 71 affixed to the sleeve member 60.

A front target 65, FIG. 14, has vertical and horizontal lines 73 and 74 which cross at 75 and form a central aiming point for impingement of a line of sight thereon. Preferably, the transparency of the front target 65 permits a line of sight 13 to pass therethrough and impinge upon the rear target 66, FIG. 13, upon which the point of impingement of the line of sight 13 thereon is readily visible. The rear target 66 includes a horizontal scale marked, for example, both in inches 76 and centimeters 77 and separated by a horizontal line 78. A vertical zero line 79 divides the target into toe-in and toe-out sides depending upon which of the vehicle wheels is being measured for toe.

Figure 15:
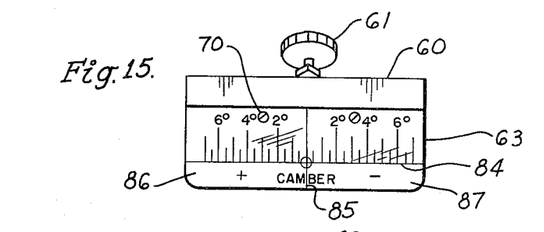
FIG. 15 is an enlarged elevational view of an upper camber target.
Figure 16:
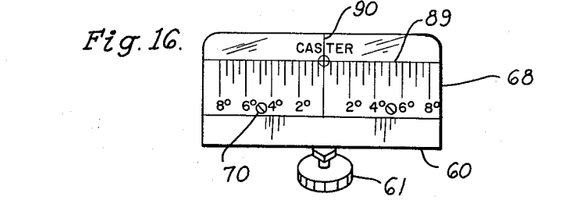
FIG. 16 is an enlarged elevational view of an upper caster target.
Figure 17:
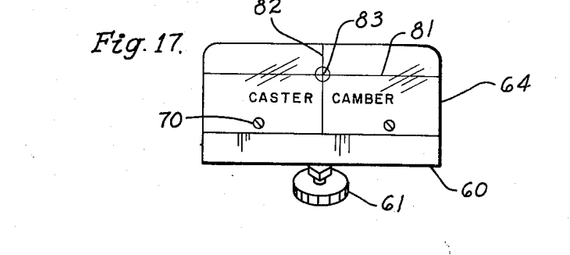
FIG. 17 is an enlarged elevational view of a bottom caster-camber target.
Figure 18:
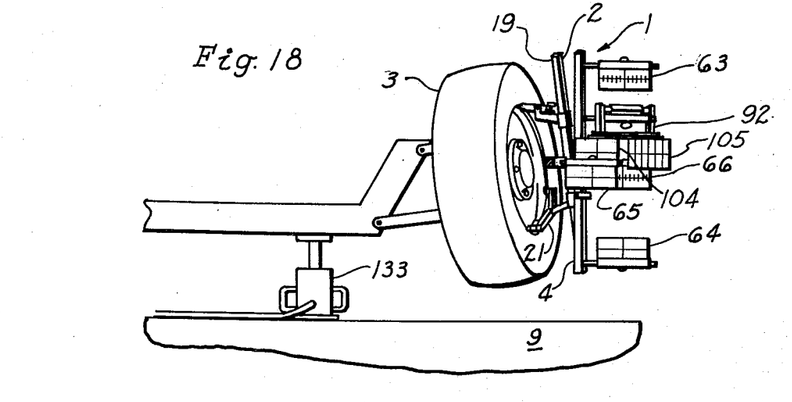
FIG. 18 is a diagrammatic, front elevational view showing the vehicle front wheel lifted from ground contact and turned in one direction to provide a measurement for determining kingpin inclination.
Figure 19:
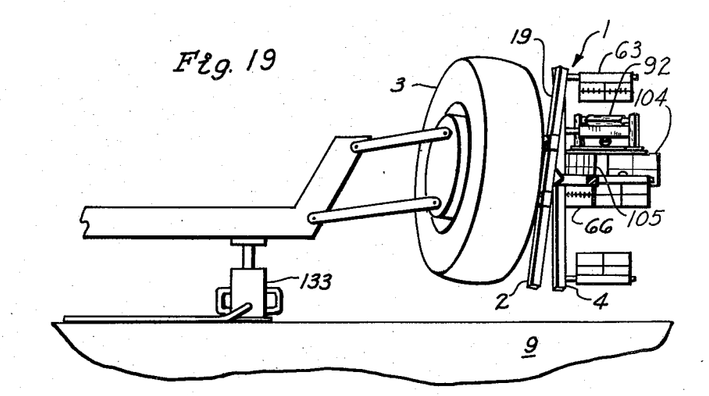
FIG. 19 is a diagrammatic front elevational view of the vehicle front wheel lifted from ground contact and turned in the opposite direction to that shown in FIG. 18.
Figure 20:
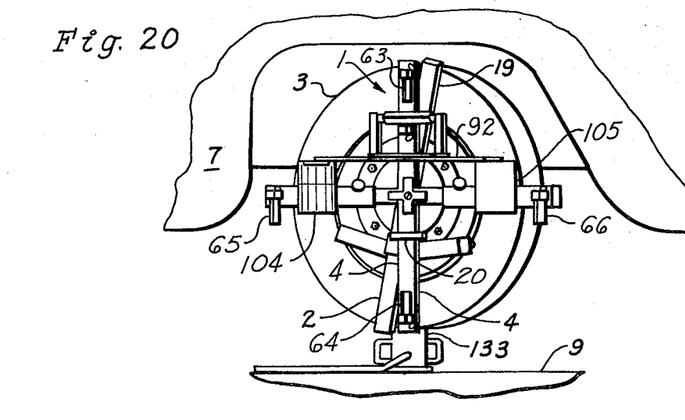
FIG. 20 is a side elevational view of the target structure and vehicle wheel as shown in FIG. 18.
Figure 21:
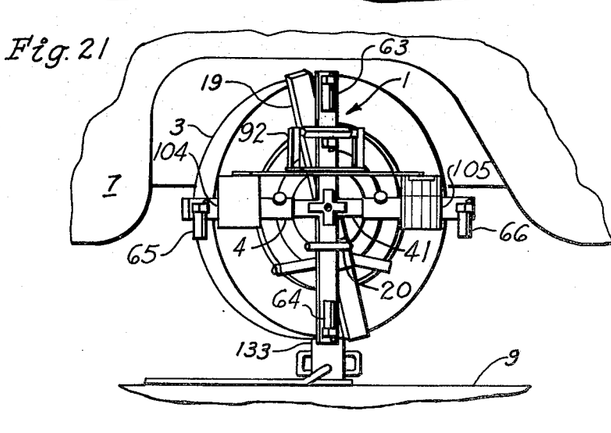
FIG. 21 is a side elevational view of the target structure and vehicle wheel as shown in FIG. 19.

FIGS. 15, 16 and 17 show upper and lower sets of targets 5 which are used to measure vertical angular relationships, such as camber, and measurements which are predominately vertical but with a horizontal component, such as caster. The lower target 64, FIG. 17, has horizontal and vertical lines 81 and 82 which cross at 83 and provide an aiming point for the line of sight 13. The upper target 63, FIG. 15, has a camber scale showing camber in plus and minus degrees from zero to eight along a horizontal scale 84. Plus and minus sides 86 and 87 of the scale are divided by a vertical zero line 85.

The lower upper target 68, FIG. 16, has a caster scale and provides a measurement of caster from zero to ten degrees along a horizontal scale 99 divided into opposite sides by a vertical zero line 90 to provide measurements of the wheel 3 during left and right turns.

Figures 8, 9, 10, 11:
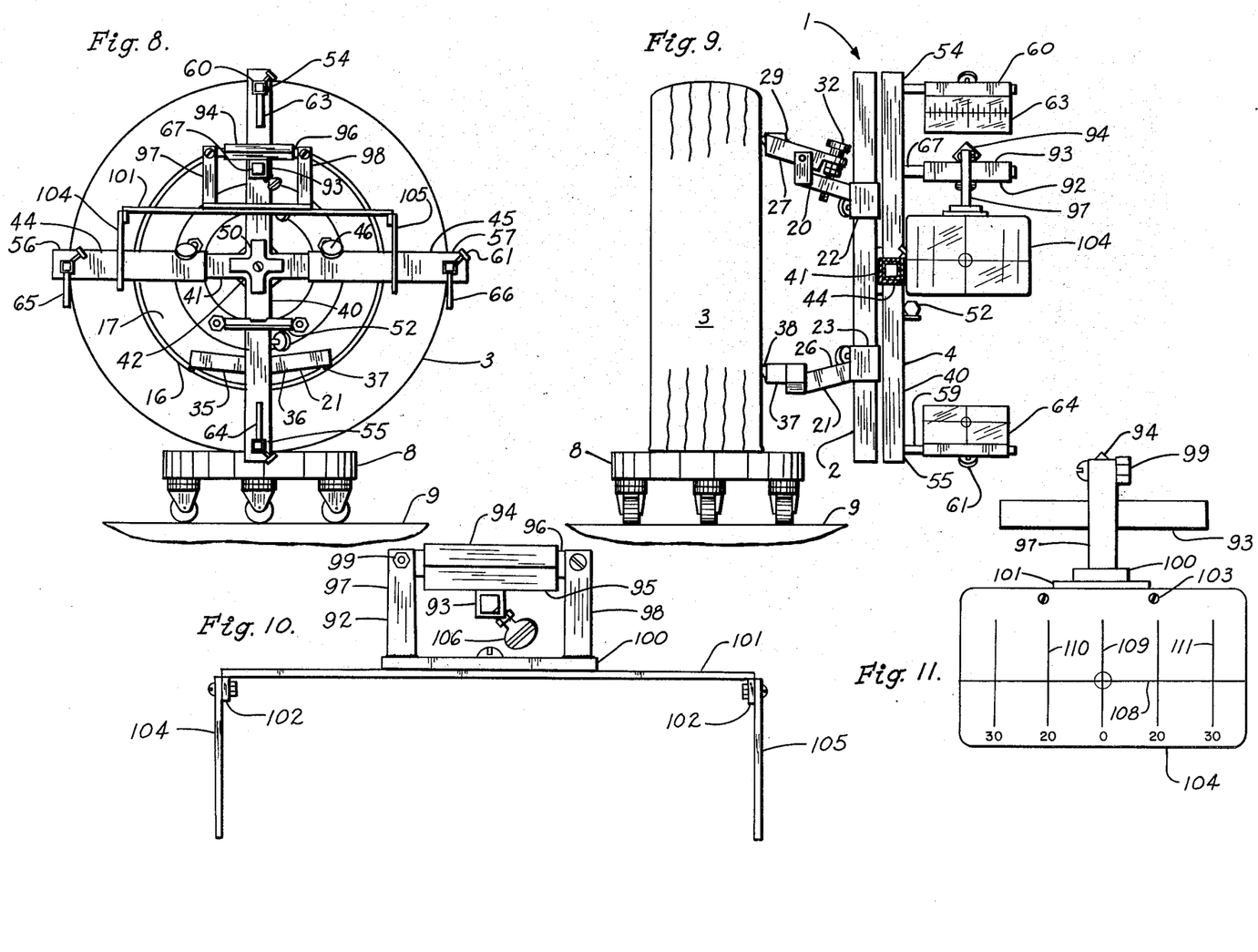
FIG. 8 is a front elevational view of the target structure upon a vehicle wheel and showing a kingpin inclination measuring device.
FIG. 9 is a front elevational view of the target structure and showing the kingpin inclination measuring device.
FIG. 10 is an enlarged, side elevational view of the kingpin inclination measuring device.
FIG. 11 is an enlarged, front elevational view of the kingpin inclination measuring device and showing the front target thereof.

FIGS. 10, 11 and 12 show targets 5 which are used to measure the predominently horizontal angular relationship of kingpin inclination or steering axis cant and that are positioned on a target hanger device 92, FIGS. 8, 9, 10 and 11 which is swingable sidewardly as the wheel 3 inclines during left and right turns. The target hanger device 92 includes a first sleeve member 93 which is secured to a second sleeve member 94 orthogonally oriented thereto. The first sleeve member 93 is of square tubing of a size to receive the arm 67 and has a fastener 106 to clamp thereon. Preferably, the second sleeve member 94 is also of square tubing which is positioned so that a lower edge or corner 95 thereof is affixed, as by welding, to the first sleeve member 93. A blade member 96 extends through the second sleeve member 94 and has opposite ends thereof secured to spaced arms 97 and 98 as by fasteners 99. Lower ends of the arms 97 and 98 are secured to a cross bar 100 which is in turn affixed to an elongate bar member 101 having downturned flanges 102 at opposite ends thereof. Fasteners 103 secure front and rear kingpin inclination targets 104 and 105 to the flanges 102 in spaced relation to each other. The edge engagement of the blade member 96 with the lower edge or corner 95 of the second sleeve member 94 permits the targets 104 and 105 to swing from side-to-side and remain oriented to gravity as the wheel 3 inclines during left and right turns. The target hanger device 92 is suspended from the arm 67 when the lower upper target 68 is removed and has a thumb screw 106. The kingpin inclination targets 104 and 105 are located at cardinal positions; that is, along the generally horizontally oriented outer cross shaft member 41 and radially inward of the front and rear targets 65 and 66.

The front kingpin inclination target 104, FIG. 11, includes a horizontal reference line 108 and a vertical zero line 109 dividing the target 104 into left and right turn segments with 20 and 30 degree indicia 110 and 111 along the horizontal reference line 108.

The rear kingpin inclination target 105, FIG. 12, includes a vertical zero line 113 dividing the target into left and right segments, each of the segments having an indicia arrangement therein including a vertical scale 114 indicating vertical components of the orientation of the kingpin or ball joint connections and a horizontal scale 115 indicating horizontal components thereof.

Figures 4, 5, 6, 7:
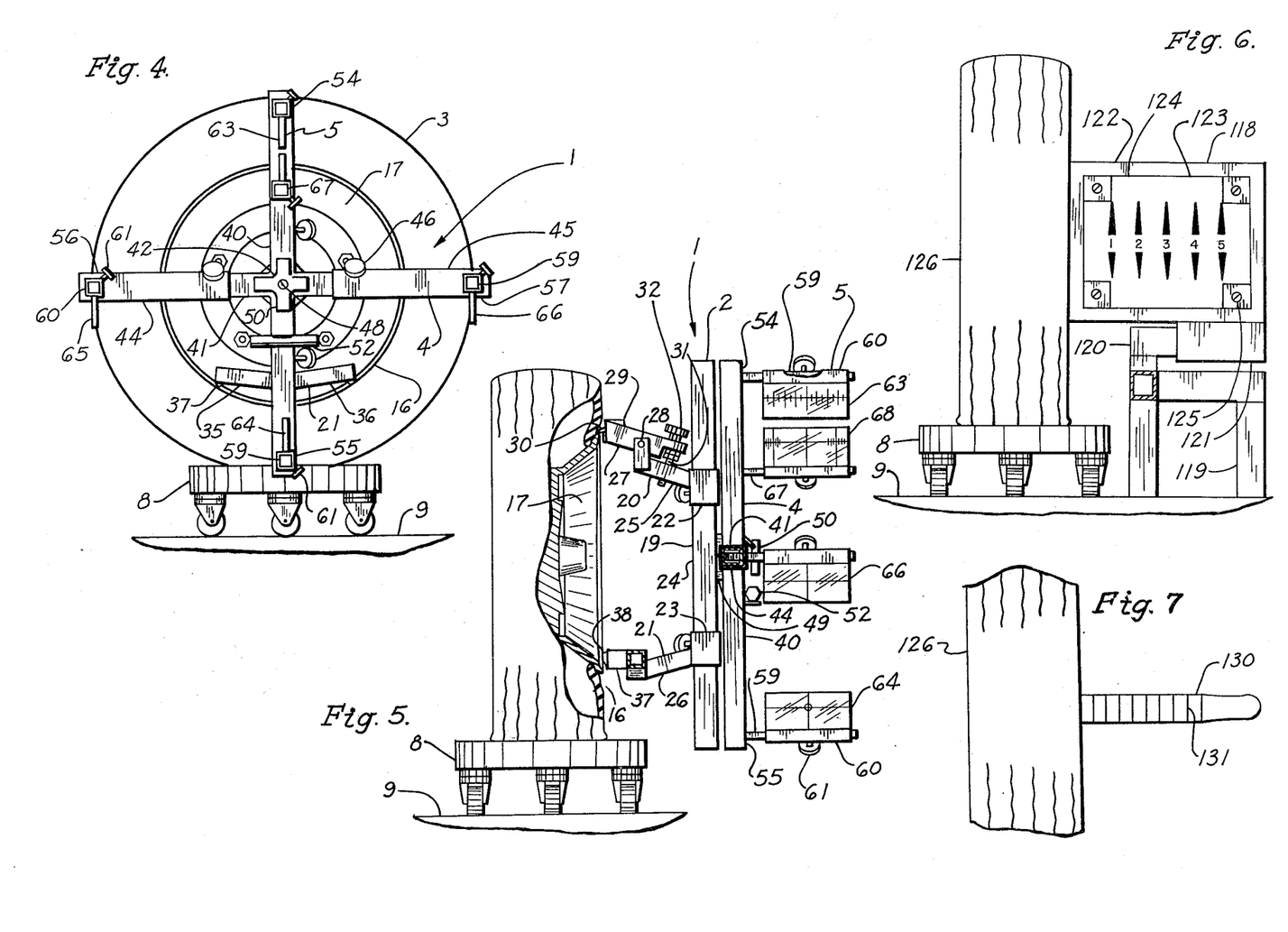
FIG. 4 is a side elevational view of the target structure mounted upon a vehicle wheel.
FIG. 5 is a fragmentary, front elevational view of the target structure upon a vehicle wheel.
FIG. 6 is a front elevational view of a preferred embodiment of vehicle rear wheel target structure.
FIG. 7 is a fragmentary front elevational view of an alternate embodiment of the vehicle rear wheel target structure.

Additionally, indicia bearing left and right wheel targets 117 and 118, FIGS. 3 and 6, are positioned adjacent vehicle wheels, such as the rear wheels, which are not the subject of the alignment operation and do not have the target structure 1 mounted thereon. In the illustrated example, each of the targets 117 and 118 include an upright standard 119 having, for example, three supportive legs and an upper L-shaped member 120 on which is received a sleeve member 121. A target frame 122 is affixed atop the sleeve member 121 and receives a target plate 123 having a plurality of scale marks or indicia 124 thereon and secured to the target frame 122 as by fasteners 125. The wheel targets 117 and 118 are movable inwardly of the standard 119 and into abutment with the face of the wheel 126 not having the target structure 1 thereon by sliding the sleeve member 121 on the L-shaped member 120 until contact is achieved. The target plate 123 is thus able to reach over a roller plate 8 upon which the wheel 126 is situated and, in conjunction with the wheels 3 longitudinally spaced therefrom and having the target structure 1 thereon provide an indication of proper tracking relationship and centering of the wheel axle.

Alternatively, a rule 130, FIG. 7, having a plurality of indicia 131 thereon can be manually held against the wheel 126.

Figure 22:
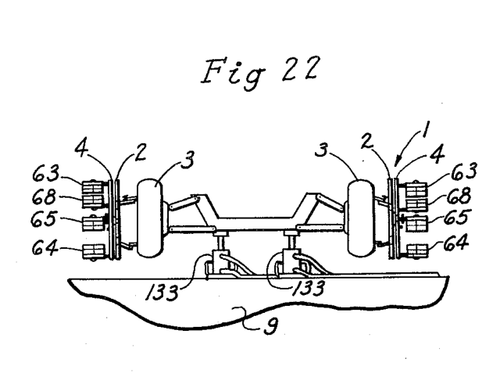
FIG. 22 is a diagrammatic, front elevational view of the front wheels of the vehicle showing the wheels raised from ground contact and with target structures thereon.

To use the target structure 1 in conjunction with the alignment apparatus 11, the vehicle 7 is preferably positioned with the wheel 3 to be aligned as close as possible to the alignment apparatus 11. The vehicle 7 is lifted, as by power jacks 133, FIG. 22, and the wheels 3 and 126 are positioned atop the roller plates 8. The vehicle 7 is aligned as much as possible transverse to the alignment apparatus 11, FIGS. 1 and 2.

After checking for worn or loose fitting parts which must be replaced for alignment, target structures 1 are mounted to each of the wheels 3 by slipping the spaced lower rim engaging tip ends 38 of the lower arm member 21 between the tire bear flange 16 and the tire. Loosening the fastener through the lower sleeve end 23, the inner shaft member 19 is moved upwardly or downwardly so as to place the center 24 thereof in coaxial alignment with the axle or hub of the wheel rim 17 and then the upper sleeve end 22 is translated on inner shaft member 19 until the tip of the catch 30 slips between the tire bead flange 16 and the tire. The fastener through the sleeve end 22 is tightened and the knob 32 of the screw arrangement 31 grasped and rotated to tighten the catch 30 against the tire bead flange 16 and attach the target structure 1 to the wheel 3.

The outer target supporting member 4 is rotated relative to the inner wheel mounting member 2 and, as indicated by the leveling vial 52, pivoted into a rotational position whereby the upstanding shaft member 40 is vertical and the outer cross shaft member 41 is horizontal. The knob 50 is tightened to prevent inadvertent relative rotation.

The sleeves 40 and 45 with the front and rear targets 65 and 66 thereon are moved along the cross shaft member 41 until the front and rear targets 65 and 66 generally coincide with the front and rear margins of the wheel 3 and thereby provide a true measurement of toe. The upper and lower targets 63 and 64, in the illustrated example, are not movable because the scales thereof are preferably calibrated with respect to a set distance or radius between the targets 63 and 68 and the lower target 64. It is preferred that the upper target 63 extend downwardly, the lower upper target 68 extend upwardly and the lower target 64 extend upwardly.

The line of sight beam projectors 12 are adjusted upwardly or downwardly until the lines of sight 13 are horizontally directed through the axle or hub center of the wheel rim 17 and the beam projectors 12 are selectively moved inwardly or outwardly until the lines of sight 13 extend parallel to the sides of the vehicle 7 and are spaced laterally equidistant from the wheels 3 and 126, as indicated by the impingement of the light beams with the targets 117 and 118 or the handheld rule 130 in conjunction with targets on the target structure 1 thereby indicating parallelism of the lines of sight 13 with the sides of the vehicle 7.

After the alignment apparatus and the vehicle 7 are "squared", or the light beams aligned parallel to the sides of the vehicle, the wheels 3 to be aligned are checked for both lateral runout; i.e., misalignment in a plane perpendicular to the center axis and radial runout; i.e., misalignment or eccentricity in the center axis. In this procedure, the wheels 3 are raised from contact with the roller plate 8 by pneumatic or hydraulic power jacks 133 so that the wheels 3 are substantially vertical, FIG. 22. The line of sight beam projectors 12 are adjusted either upwardly or downwardly until the lines of sight 13 therefrom extend horizontally through the vehicle wheel center or axle. Next, the lines of sight 13 are swept in a vertical plane toward either the upper targets 63 or the lower targets 64 to check for proper camber or vertical runout. The impingement of each line of sight 13 with a scale mark of either the upper or lower target 63 or 64 is preferably noted, as by marking, recording or other means. Next, the wheel is rotated 180 degrees and the impingement of the line of sight 13 noted upon the opposite target now in the line of sight 13. The impingement of the line of sight 13 should be at the same lateral scale mark on both targets. If there is deviation from proper vertical runout, suspension parts such as the upper control arm should be adjusted until the points of impingement lie in the same vertical plane.

Next, horizontal or toe runout is checked by directing a line of sight 13 toward the horizontal front and rear targets 65 and 66 and noting the point of impingement of the line of sight 13 upon the front target 65 and the reciprocal rear target 66. The point of impingement of the line of sight upon the rear target 66 should be at the same lateral scale marking as on the front target 65. If there is deviation, suspension parts such as the tie rod should be adjusted. Runout checks are now complete and the wheel, when raised from ground contact and spun on its axis, should not wobble or spin eccentrically.

Figures 23, 24, 25:
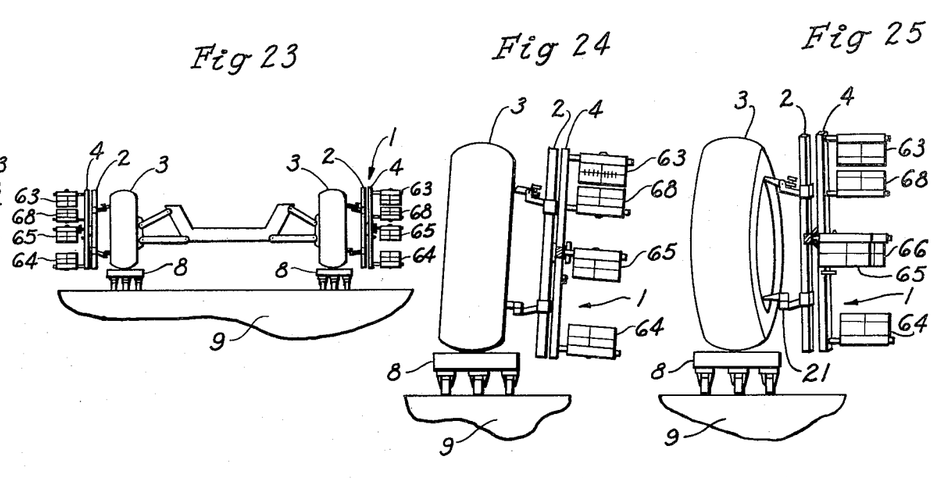
FIG. 23 is a diagrammatic, front elevational view of the vehicle front wheels in ground contact and with target structures mounted thereon.
FIG. 24 is a diagrammatic, front elevational view of a vehicle wheel with a target structure thereon and shown with respect to the measurement of camber, the angle of which is exaggerated for purposes of illustration.
FIG. 25 is a diagrammatic, front elevational view of a vehicle wheel with a target structure mounted thereon and shown with respect to the measurement of toe, the angle of which is exaggerated for purposes of illustration.

The wheels 3 are then lowered onto the roller plates 8, FIG. 23, for checking camber, illustrated in an exaggerated angle thereof in FIG. 24 for purposes of illustration. The lines of sight 13 are adjusted to extend horizontally through the cross point 83 of the lower target 64 and then the line of sight is swept upwardly in a vertical plane to spot a point of impingement on the camber scale marks of the upper target 63 indicating, for example, two degrees of negative camber to the lower target 98. The deviation, or degree of vertical angle, appears as the difference from exactly vertical orientation between the line of sight impingement points of the upper and lower targets 63 and 64 and the camber scale 84 provides a measurement corresponding to actual degrees of camber. Adjustment of the suspension and steering parts may be necessary to set the manufacturer's specified camber angle.

Measurement of toe, FIG. 25, is accomplished by procedures similar to camber measurement. Keeping the line of sight beam projectors 12 situated above the floor surface 9 substantially the same height thereabove as the wheel hub or axle is situated above the floor surface, a line of sight 13 is directed through the cross point 75 of the front target 65 and impinges upon the surface of the rear target 66, preferably along the horizontal line 78 on either a toe-in or toe-out side of the target. The front and rear targets 65 and 66 are adjacent the front and rear margins of the wheel and the deviation, or degree of horizontal angle from a straight ahead orientation is indicated on the rear target 66 and is a true measurement of toe. Adjustment of the proper vehicle steering and suspension member such as the tie rod, may be required.

Figure 26:
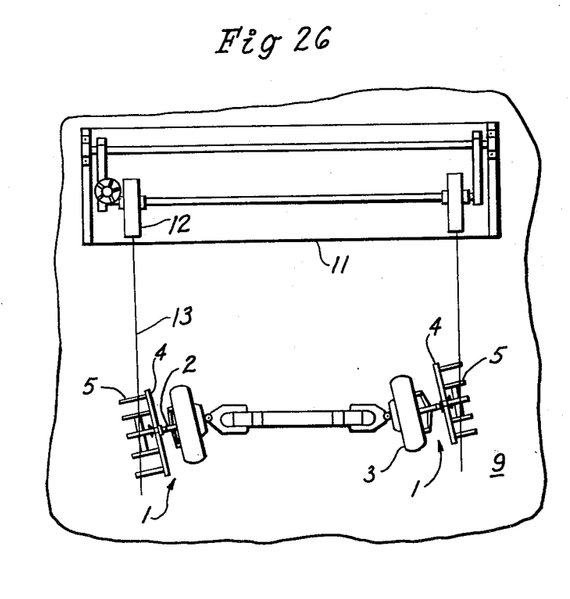
FIG. 26 is a diagrammatic, plan view of a vehicle axle and front wheels thereof and shown with respect to the measurement of caster.
Figure 27:
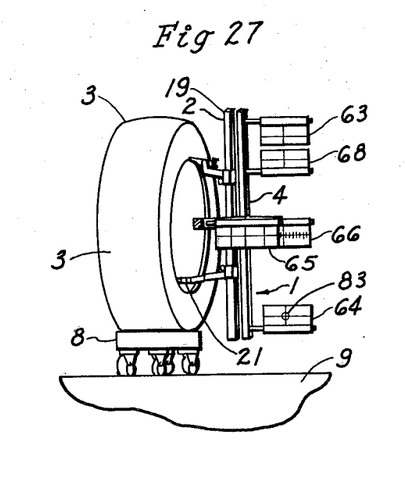
FIG. 27 is a diagrammatic, front elevational view showing a measurement of caster in one turning direction of a wheel
Figure 28:
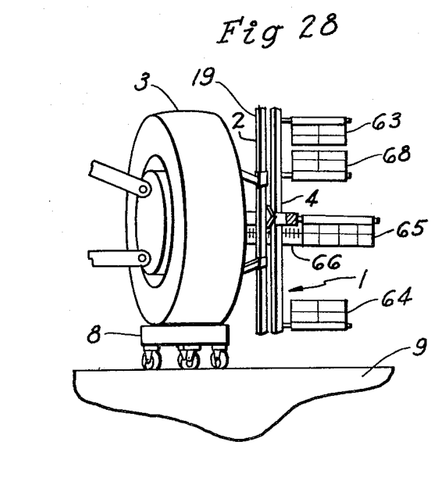
FIG. 28 is a diagrammatic, front elevational view showing caster measurement in an opposite turning direction to that shown in FIG. 27.

Next to be checked is caster, FIGS. 26, 27 and 28, which is the cant of the upper ball joint toward the rear of the vehicle. Caster, like camber and toe, is measured with the weight of the vehicle upon the wheels to be aligned. Using a degrees of turn indicating device, such as a radius plate, the wheels 8 are turned 20 degrees either left or right from a straight ahead direction, FIG. 26. The line of sight beam projectors 12 are translated laterally to beam respective lines of sight 13 through the cross point 83 of the lower targets 64. The lines of sight 13 are swept upwardly and a point of impingement noted upon the caster scale of the lower upper target 68, for example negative 2 degrees in a right turn, FIG. 27. This is one direction of the angular rotational deviation caused by the cast of the upper ball joint. The wheels 3 are turned 40 degrees in the opposite direction, or 20 degrees past the straight ahead position, FIG. 28, and the angular rotational deviation is noted upon the caster scale 89 of the lower upper target 68, for example ¾ degree. The difference between the two measurements, for example 1¼ degrees, is the angle of caster of the wheel.

During both left and right turns, the outer target supporting member 4 tends to rotate upwardly and downwardly about the axis of the wheel spindle. To provide precise measurement, prior to impingement of the line of sight 13 with the targets the outer target supporting member 4 is rotated relative to the inner wheel mounting member 2 to return the cross shaft member 41 to a level orientation as indicated by the leveling vial 52. By leveling the cross shaft member 41, angular deviation caused by rocking of the wheel 3 about the inclined ball joint thereof is not erroneously introduced into the caster measurement.

Steering axis cant or kingpin inclination FIGS. 18, 19, 20 and 21 is determined with the weight of the vehicle 7 removed from the wheels 3 and with the vehicle raised, as by the jacks 133. The vehicle brakes are applied and held down to prevent rotation of the wheels about the axles thereof. The lower upper target 68 is removed and replaced with the target hanger device 92 by urging the first sleeve member 93 thereof over the arm 67 and tightening the thumb screw 106. The wheels 3 are turned 20 degrees either left or right and the beaming of the line of sight 13 through the front inclination target 109 coincident with one of the 20 degree scale marks, for example, and impingement of the line of sight with one of the vertical scale lines 114 on the rear kingpin inclination target 105, FIG. 12, indicates degrees of turn of the wheel 3. Because the wheel tends to incline as it is steered left and right the target structure 1 also tends to incline and the cross shaft member 41 moves out of a horizontal orientation. To provide precise measurements, the outer target supporting member 4 is rotated relative to the inner wheel mounting member 2 and leveled by use of the leveling vial 52, FIGS. 20 and 21. The impingement of the line of sight 13 with one of the marks, either negative or positive on the vertical scale 114, provides a component of kingpin inclination in that direction of turn.

Additionally, a measurement of turning radius degrees is provided on the horizontal scale 115. The wheels 3 are turned 40 degrees in the opposite direction, or 20 degrees past the straight ahead position and a point of the line of sight impingement is determined as indicated above for the opposite turn. The angle of steering axis cant is then determined by the average of the left and right turn measurements.

It will be apparent from the preceding description that the target structure 1 of the present invention has features which enable it to be easily and quickly used by even a relatively inexperienced vehicle mechanic. Intensive training is not required to enable the operator to understand the theory and procedures of operation of the apparatus, thus offering relatively few opportunities for error. Further, relatively precise scale measurements are individually indicated on the target structure 1.

It is to be understood that while one form of this invention has been illustrated and described, it is not to be limited to the specific form or arrangement of parts herein described and shown, except insofar as such limitations are included in the following claims.

What is claimed and desired to secure by Letters Patent is:

1. A target structure mountable upon a wheel of a vehicle for checking the alignment thereof and comprising:

(a) a target support;
(b) means for mounting said target support to a wheel in laterally spaced relationship to a side of said wheel; and
(c) a plurality of targets attached to said target support and respectively having a planar portion extending laterally of the side of said wheel and spaced radially from the rotational axis of said wheel;
(d) said plurality of targets including four said targets respectively positioned on horizontal and vertical cardinal locations around said wheel;
(e) said cardinal locations including vertically aligned upper and lower locations and horizontally aligned front and rear locations.

2. The target structure set forth in claim 1 wherein:
(a) said target support includes elongate horizontal and vertical shaft members forming a cross structure having a center coaxial with the rotational axis of said wheel and having spaced end portions generally terminating at the margins of said wheel and having said targets mounted thereon.

3. A target structure mountable upon a wheel of a vehicle for checking the alignment thereof and comprising:
(a) an inner wheel mounting member;
(b) upper and lower arm members attached to said inner mounting member and having end portions including means for engagement with said wheel and supporting said inner mounting member in adjacent and parallel relationship to the side of said wheel;
(c) an outer upstanding shaft member and an outer cross shaft member affixed together and forming an outer target mounting member having a center;
(d) a plurality of targets mounted to said outer upstanding shaft member and outer cross shaft member and positioned for extending outwardly of said wheel; said targets being sightable along lines of sight generally parallel to a longitudinal axis of said vehicle to establish an angular relation of the wheel to said vehicle; and
(e) pivot means connecting the center of said outer target mounting member to said inner wheel mounting member and permitting relative rotation therebetween generally in a vertical plane.

4. The target structure set forth in claim 3 including:
(a) leveling indicator means mounted on said outer target mounting member for determining a horizontal orientation of said outer cross shaft member.

5. The target structure set forth in claim 4 wherein:
(a) said leveling indicator means includes a leveling vial having a quantity of fluid and a bubble therein.

6. The target structure set forth in claim 3 including:
(a) a plurality of arms extending generally horizontally outwardly from said outer shaft member and outer cross shaft member; and
(b) said targets are respectively mounted on said arms.

7. The target structure set forth in claim 6 wherein:
(a) said outer shaft member and outer cross shaft member respectively have end portions; and
(b) said arms and said targets are respectively located adjacent said end portions.

8. The target structure set forth in claim 7 wherein:
(a) said outer upstanding shaft member has upper and lower end portions and said outer cross shaft member has front and rear end portions; and
(b) said targets include front and rear toe targets respectively extended outwardly from said front and rear end portions and upper and lower caster/camber targets respectively extended outwardly from said upper and lower end portions.

9. The target structure set forth in claim 8 wherein:
(a) said targets include a kingpin inclination target arrangement extended outwardly of the upper end portion.

10. The target structure set forth in claim 9 wherein:
(a) said kingpin inclination target arrangement includes a tubular member sleevable over one of said arms adjacent said upper end portion and a swing arm member transversely and pivotally mounted to said tubular member;
(b) said kingpin inclination target arrangement includes forward and rearward targets respectively depending from said swing arm member and mounted for side-to-side swinging movement.

11. The target structure set forth in claim 3 wherein:
(a) said inner wheel mounting member and said outer target mounting member respectively include center locations;
(b) said pivot means includes a fastener extended outwardly from the center location of the inner wheel mounting member and through the center location of the outer target mounting member; and
(c) a knob threadably mounted on said fastener and adapted for grasping to tighten and loosen said fastener and permit relative rotation of said outer target mounting member relative to said inner wheel mounting member.

12. A target structure mountable upon a wheel of a vehicle for checking the alignment thereof and comprising:
(a) an inner mounting member having means for attachment to a wheel of a vehicle;
(b) an outer target supporting member adjacent said inner mounting member;
(c) pivot means connecting said outer target supporting member to said inner mounting member and permitting relative rotation therebetween;
(d) a plurality of targets attached to said target supporting member; and
(e) a plurality of arms extending outwardly of said target supporting member;
(f) said targets being positioned on said arms.

13. A target structure mountable upon a wheel of a vehicle for checking the alignment thereof and comprising:
(a) a target support;
(b) means for mounting said target support to a wheel in laterally spaced relationship to a side of said wheel;
(c) a plurality of targets attached to said target support and respectively having a planar portion extending laterally of the side of said wheel and spaced radially from the rotational axis of said wheel;
(d) said plurality of targets including at least two said targets positioned on opposed cardinal locations relative to said wheel;
(e) said cardinal locations being selected from vertically aligned upper and lower locations and horizontally aligned front and rear locations.

* * * * *